United States Patent [19]

Lee et al.

[11] Patent Number: 5,684,284
[45] Date of Patent: Nov. 4, 1997

[54] APPARATUS FOR MEASURING DISTANCES IN THE GAME OF GOLF

[76] Inventors: Chung-Hoon Lee, 24 Marbourne Dr., Mamaroneck, N.Y. 10543; Joseph C. Dokko, 221 Worthington Way, White Plains, N.Y. 10607; Ji-Hoon Lee, 24 Marbourne Dr., Mamaroneck, N.Y. 10543

[21] Appl. No.: 491,262

[22] Filed: Jun. 16, 1995

[51] Int. Cl.$^6$ ............................................. G01C 22/00
[52] U.S. Cl. ................................. 235/105; 377/24.2
[58] Field of Search ........................ 235/105, 144 E; 377/24.2, 24.1, 32

[56] References Cited

U.S. PATENT DOCUMENTS

| | | | |
|---|---|---|---|
| 4,220,996 | 9/1980 | Searcy | 235/105 |
| 4,322,609 | 3/1982 | Kato | 235/105 |
| 4,821,218 | 4/1989 | Potsch | 235/105 |
| 4,887,281 | 12/1989 | Swanson . | |
| 4,991,126 | 2/1991 | Reiter | 235/105 |
| 5,005,002 | 4/1991 | Halperin . | |
| 5,117,444 | 5/1992 | Sutton et al. . | |

*Primary Examiner*—Cassandra C. Spyrou

*Attorney, Agent, or Firm*—Thomas A. Gallagher

[57] ABSTRACT

An apparatus for measuring distance in the game of golf includes an electro-mechanical DriveGauge™ which is provided with a large, easy-to-read display and which registers the player's strides in yards. The apparatus is preferably contained in an attractive housing having a belt clip and the display is mounted "upside down" so that the player may read the display without removing the apparatus from his/her belt. A large prominently colored reset button is preferably provided adjacent to the display so that the display may be quickly and easily reset to zero after a measurement is noted by the player. According to a presently preferred embodiment of the invention, an electromechanical transducer is coupled through a noise filter to a counter which is coupled through a display control and driver to a large four digit LCD display. A clock oscillator is coupled to a system clock unit which provides clock signals for the noise filter and the display control and driver. A stride register is set by a setting unit and provides output to the counter. The noise filter prevents extraneous mechanical vibration of the unit from registering as a player's stride. The LCD display preferably displays up to 999.9 yards in increments of 0.1 yards. In order to set the stride register, the player inputs the distance in feet using the setting unit using a single button which is pressed repeatedly, each press representing 0.1 feet.

14 Claims, 5 Drawing Sheets

APPARATUS FOR MEASURING DISTANCES IN THE GAME OF GOLF

BACKGROUND OF THE INVENTION

1. Field of the invention

The invention relates generally to an apparatus for use by a golfer during a game of golf. More particularly, the invention relates to an electro-mechanical device for use by a golfer to measure distances in yards.

2. State of the Art

The game of golf is widely played throughout the world. An important aspect of the game is judging how far a ball has travelled from the tee and how far the ball is from the green. These measurements are important in order to assess one's driving ability (how far the ball has travelled) and in order to choose the proper club for the next stroke (how far the ball is from the green). These distances are universally measured in yards. Traditionally, these distances were estimated visually or by counting the number of paces from the tee to the ball or from the ball to the green. Often a golf caddy will provide a player with his expert approximation of how far the ball is from the green so that an appropriate club may be selected for the next stroke. It is quite common for a golfer to devote a substantial amount of time estimating these distances during the course of a game.

Recently, various optical, electronic, and electromechanical devices have been developed to assist in estimating distances in the game of golf. The simplest device is an optical viewfinder which estimates the distance from the player to the pin (flag stick). This is accomplished by viewing the flag stick through the viewfinder and aligning the image of the flag stick between two converging lines in the viewfinder. The theory upon which this device operates is that objects which are distant appear smaller than objects which are near. A scale indicating yards is arranged along one of the lines in the viewfinder and allegedly indicates how far the aligned flag stick is from the player. This device may have some utility, but it is painfully inaccurate. It is only operable under certain weather conditions and where the player has a clear line of sight to the flag stick. The player must be within a certain range of the flag stick, e.g. 50–220 yards. Most importantly, it assumes that all flag sticks are of uniform height, which they are not.

A more accurate device is known which attaches to the wheels of a golf cart and measures distance in the same manner as an odometer on an automobile or bicycle. An immediately apparent disadvantage of the golf cart odometer is that if a golf cart is shared by two golfers the device cannot distinguish between the two balls in play. In addition, not all golfers use golf carts, and the acquisition of a golf cart and the odometer device presents a substantial expense to the frugal golfer.

More recently, extremely sophisticated electronic devices have been developed or adapted from military technology. These devices utilize sensors/transponders placed around the periphery of the golf course, or they use lasers to detect a reflector on a flag stick. There are even some systems which utilize satellite navigational signals. Some of the devices provide digital maps of the course, reports of weather conditions and computer generated advice regarding club selection. These systems are extremely expensive, must be installed on the course, are subject to high maintenance, and system failure. Only about five courses in the U.S. have installed such systems and golfers must rent or purchase handheld units or cart attachments which can cost over $250. In addition, the use of these sophisticated systems violates rule 14-3b of the USGA which, as amended in 1994, does not permit the use of distance measuring devices which are capable of providing information such as advice regarding club selection, temperature, humidity, wind direction and wind speed. Nevertheless, interest in distance measuring devices for use in the game of golf remains high. Theoretically, these devices enable the players to achieve better scores and allow them to play the game more rapidly.

SUMMARY OF THE INVENTION

It is therefore an object of the invention to provide a simple but relatively accurate apparatus for measuring distance in the game of golf.

It is also an object of the invention to provide an apparatus for measuring yards in the game of golf which is inexpensive and easy to use.

It another object of the invention to provide an apparatus for measuring yards in the game of golf which may be used by an individual player without the need for a golf cart.

It is also an object of the invention to provide an apparatus for measuring yards in the game of golf which is small, lightweight, and may be attached to the golfer's clothing.

It is still another object of the invention to provide an apparatus for measuring yards in the game of golf which complies with the amended rules of the USGA.

In accord with these objects which will be discussed in detail below, the apparatus of the present invention includes an electromechanical DriveGauge™ which is provided with a large, easy-to-read display and which registers the player's strides in yards. The apparatus is preferably contained in an attractive housing having a belt clip and the display is mounted "upside down" so that the player may read the display without removing the apparatus from his/her belt. A large prominently colored reset button is preferably provided adjacent to the display so that the display may be quickly and easily reset to zero after a measurement is noted by the player. According to a presently preferred embodiment of the invention, an electromechanical transducer for registering the player's strides is coupled through a noise filter to a counter which is coupled through a display control and driver to a large four digit LCD display. A clock oscillator is coupled to a system clock unit which provides clock signals for the noise filter and the display control and driver. A stride register is set by a setting unit and provides output to the counter and the display control and driver. The noise filter prevents extraneous mechanical vibration of the unit from registering as a player's stride. The stride register stores the distance value of the player's stride which is used by the counter to accumulate the distance walked by the golfer. A large reset switch is coupled to the counter for resetting the stride count, and thus the display to zero. The LCD display preferably displays up to 999.9 yards in increments of 0.1 yards. In order to set the stride register, the player inputs the distance in feet using the setting unit. In the presently preferred embodiment, the input to the setting unit is a single button which is pressed repeatedly, each press representing 0.1 feet. The accumulated stride value is displayed on the LCD display.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
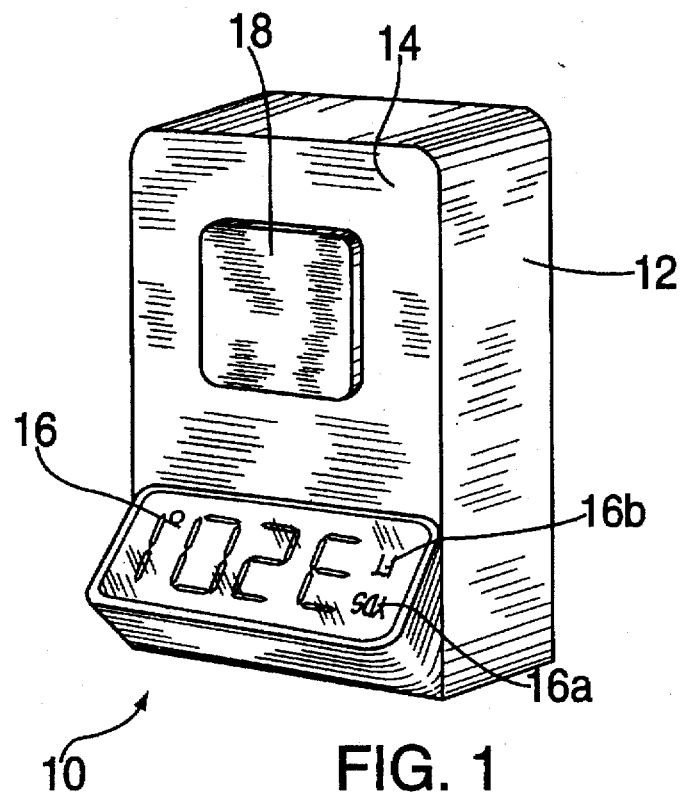
FIG. 1 is a perspective view of the front of a DriveGauge™ according to the invention.

Referring now to FIGS. 1, 1a, 1b, 2, 2a, and 2b, the measuring apparatus 10 according to the invention is preferably housed in an attractive plastic case 12 which is approximately two inches by two inches by one inch. The front 14 of the case 12 is provided with a relatively large four digit LCD display 16 which is angled upward from the bottom of the case and which displays numbers "upside down". A relatively large reset button 18 is located above the display 16. According to the presently preferred embodiment, the case 12 is a neutral color such as grey or green and the reset button 18 is a distinctive color such as red or orange. The back 20 of the case 12 is provided with a belt clip 22, a setting button 24, and a removable cover 26 for accessing a battery compartment.

Figure 3:
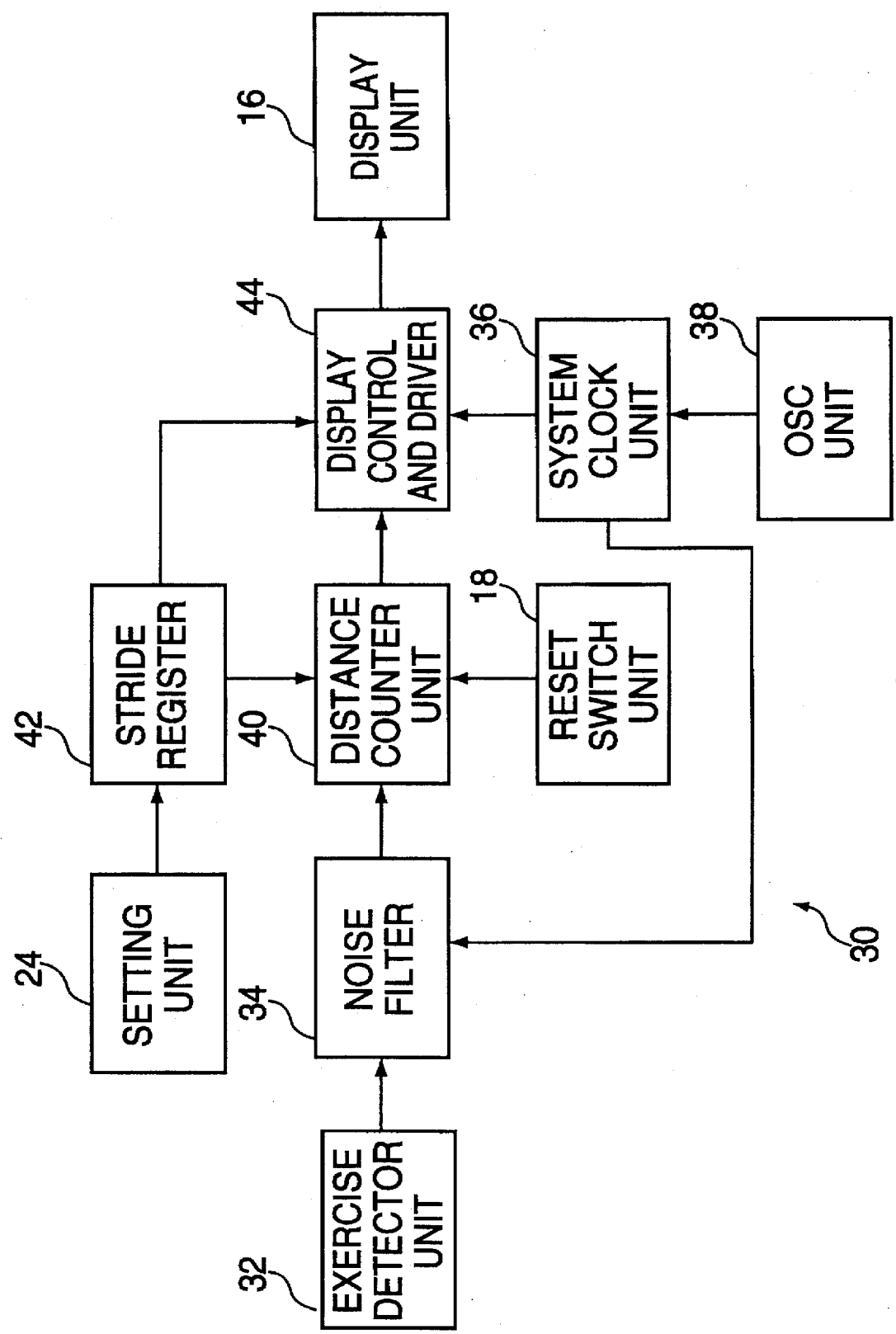
FIG. 3 is a block diagram describing the functional components of the presently preferred embodiment of the invention.

Turning now to FIG. 3, an electromechanical circuit 30 is enclosed inside the housing described above. The presently preferred embodiment of the circuit 30 is mostly included on a custom made IC chip which contains substantially all of the components except for the display, the switches (buttons), and the battery. FIG. 3 is a functional block diagram of the circuit 30 which is intended to enable one skilled in the art to fabricate an appropriate circuit using commonly available components. As mentioned above, it is an object of the invention to provide a display indicating the number of yards walked by a golfer. To this end, the circuit 30 includes a transducer 32 which is responsive to walking movement of a person wearing the apparatus. The signals produced by the transducer 32 are preferably filtered by a noise filter 34 which receives a clock signal from a system clock unit 36 driven by an oscillator 38. The noise filter 34 is designed to eliminate extraneous signals generated by the transducer 32 due to vibrations other than walking movement. The output from the noise filter 34 is coupled to a counter/accumulator 40 which incrementally accumulates numerical values based on the number of strides taken by the golfer. The values which are accumulated by the counter/accumulator 40 depend on the contents of the stride register 42 which stores a numerical value representing the distance covered by the golfer's stride. Consequently, the stride register 42 is coupled to the counter accumulator 40. The value in the stride register 42 is set by a setting unit (button) 24 mentioned above and described in more detail below. The accumulated value in the counter/accumulator 40 may be reset to zero by the reset switch (button) 18 described above. The value accumulated in the counter/accumulator 40 is displayed on the LCD display 16 by means of control/driver unit 44 which receives input from the counter/accumulator 40, the system clock 36, and the stride register 42.

Figure 4:
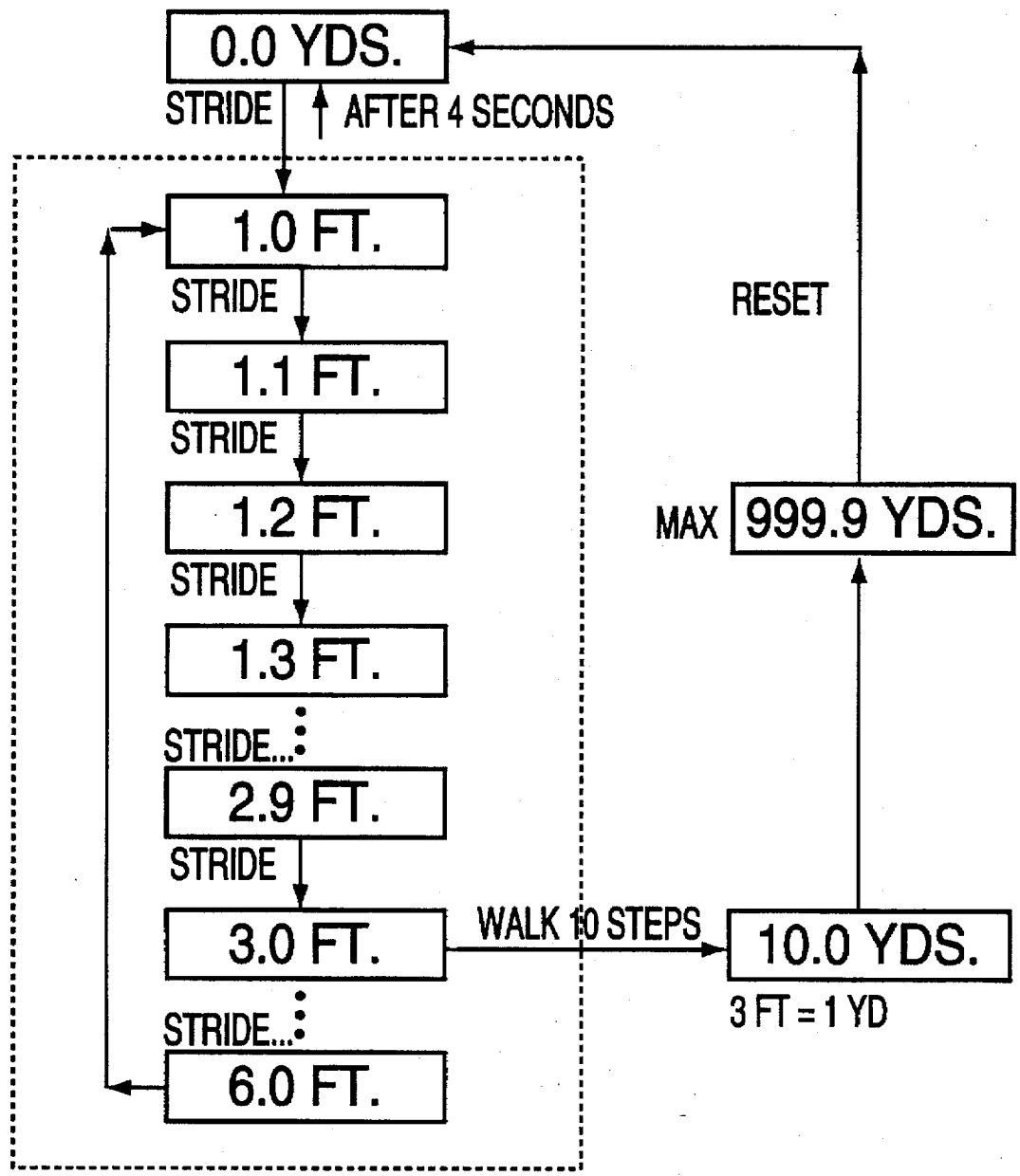
FIG. 4 is a flow chart illustrating the operation of the setting unit.

During normal operation, the LCD 16 displays a number which represents the value contained in the counter/accumulator 40 and which indicates the number of yards (to the nearest tenth) walked by the golfer. During a setting operation, the LCD 16 displays a number which represents the value contained in the stride register 42 which indicates the golfer's stride in feet (to the nearest tenth). The circuit 30 defaults to the normal operation mode and is typically always ON once a battery (not shown) is installed. The setting mode of operation is activated by pressing the setting button 24 (FIG. 2) which is preferably recessed in the case 12 so that it is not inadvertently pressed. FIG. 4 illustrates the functional operations involved in setting the stride register.

Figure 2:
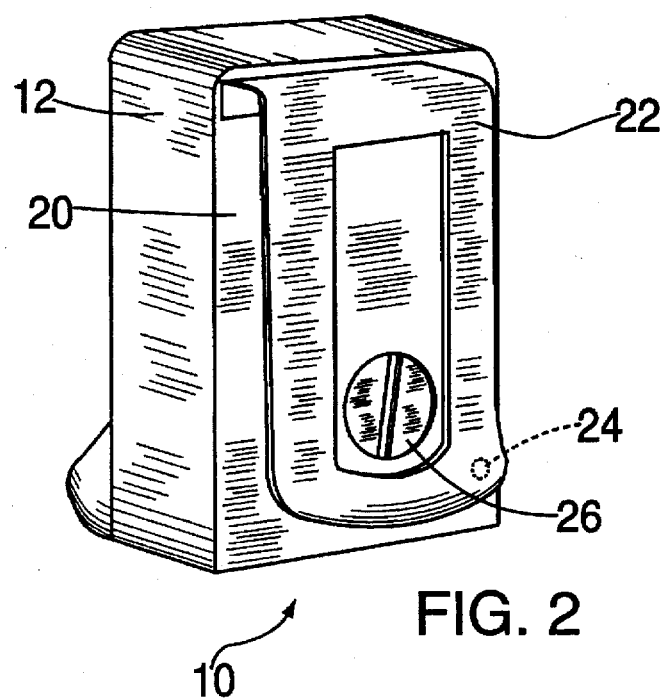
FIG. 2 is a perspective view of the back of a DriveGauge™ according to the invention.
Figure 1A:
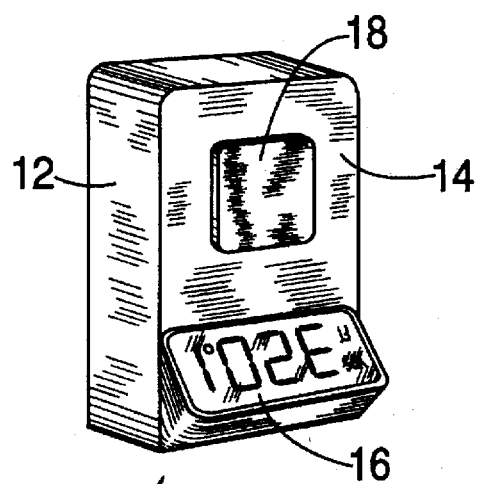
FIGS. 1a and 1b are views similar to FIG. 1 of a presently preferred embodiment of the invention.
Figure 2A:
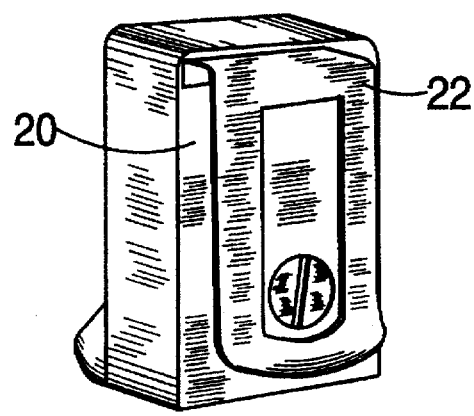
FIGS. 2a and 2b are views similar to FIG. 2 of a presently preferred embodiment of the invention.
Figure 1B:
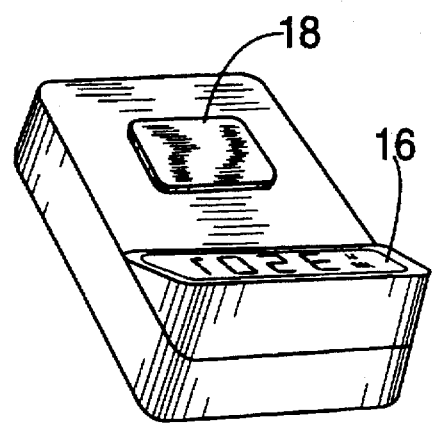
Figure 2B:
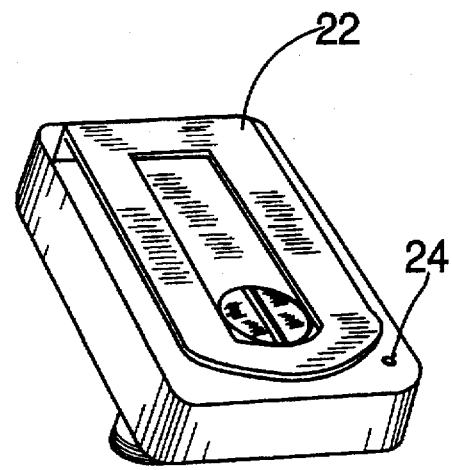

Turning now to FIGS. 1, 2, and 4, it will be appreciated that before the stride register can be set, the golfer must first determine the length of his/her stride in feet. The preferred method of determining this distance is to walk ten paces from a marked starting point, to measure the distance walked in feet, and to divide that measured distance by ten. This will yield an average stride length for ten paces. In order to set the stride register, the LCD 16 is zeroed by pressing the reset button 18, and the setting button 24 is pressed, typically with a pointed object like a pen or a pencil point. The LCD display 16 preferably includes alphanumeric indicators 16a and 16b which respectively display the letters "YDS" and "FT" in order to indicate the mode of operation, i.e. normal or setting. Upon pressing the setting button for the first time, the LCD will display "1.0" indicating a stride of one foot. Repeated pressings of the setting button increment the display by tenths of a foot. Thus, in order to set the stride register to two feet, the golfer will press the setting button ten times. When the setting button is not pressed for a certain time, e.g. four seconds, the circuit returns to normal operation mode and displays yards walked. If the setting button is pressed fifty times, i.e. yielding a stride length of six feet, the stride register will loop back to zero. Thus, in the setting mode, the display has a minimum value of "1.0" and a maximum value of "6.0" with "0.1" increments. As mentioned above, in the normal mode, the display has a minimum value of "0.0" and a maximum value of "999.9" with "0.1" increments.

After the stride register has been set, the apparatus is ready for use in measuring yards in the game of golf. The golfer attaches the apparatus to an article of clothing, typically a belt using the belt clip. After hitting the golf ball from the tee, the golfer presses the reset button and begins walking to the ball. When the golfer is at the ball, the LCD display indicates the number of yards (to the nearest tenth) that the ball has been driven from the tee. The golfer is then able to determine the success of the drive and, may estimate the distance to the green. For example, the total distance from the tee to the green is generally known for each hole on the course. By subtracting the drive distance indicated by the invention from the known total distance to the green, the golfer can approximate the distance from the ball to the green. This distance can be used by the golfer to select the appropriate club for the next stroke. Alternatively, the golfer can press the reset button and walk from the ball to the green and read the distance indicated on the display.

The invention provides information in compliance with amended rule 14-3b of the USGA, and therefore may be used in actual games of golf. While the rules may not permit the invention to be used in a tournament, it is extremely useful as a training device prior to a tournament to train the golfer's eye for regulation play. The invention's simplicity and ease of use make it an attractive accessory for any golfer. The large "upside down" display is easy to read and the indication of yards walked provides the golfer with immediate information without the need for calculations or conversions. The stride register can be set to accommodate virtually any golfer's stride and the belt clip allows the apparatus to be attached to almost any article of clothing. The relatively small size and attractive styling of the apparatus make it unobtrusive during the game of golf. The prominently colored large reset button allow the apparatus to be operated quickly and confidently.

Figure 5:
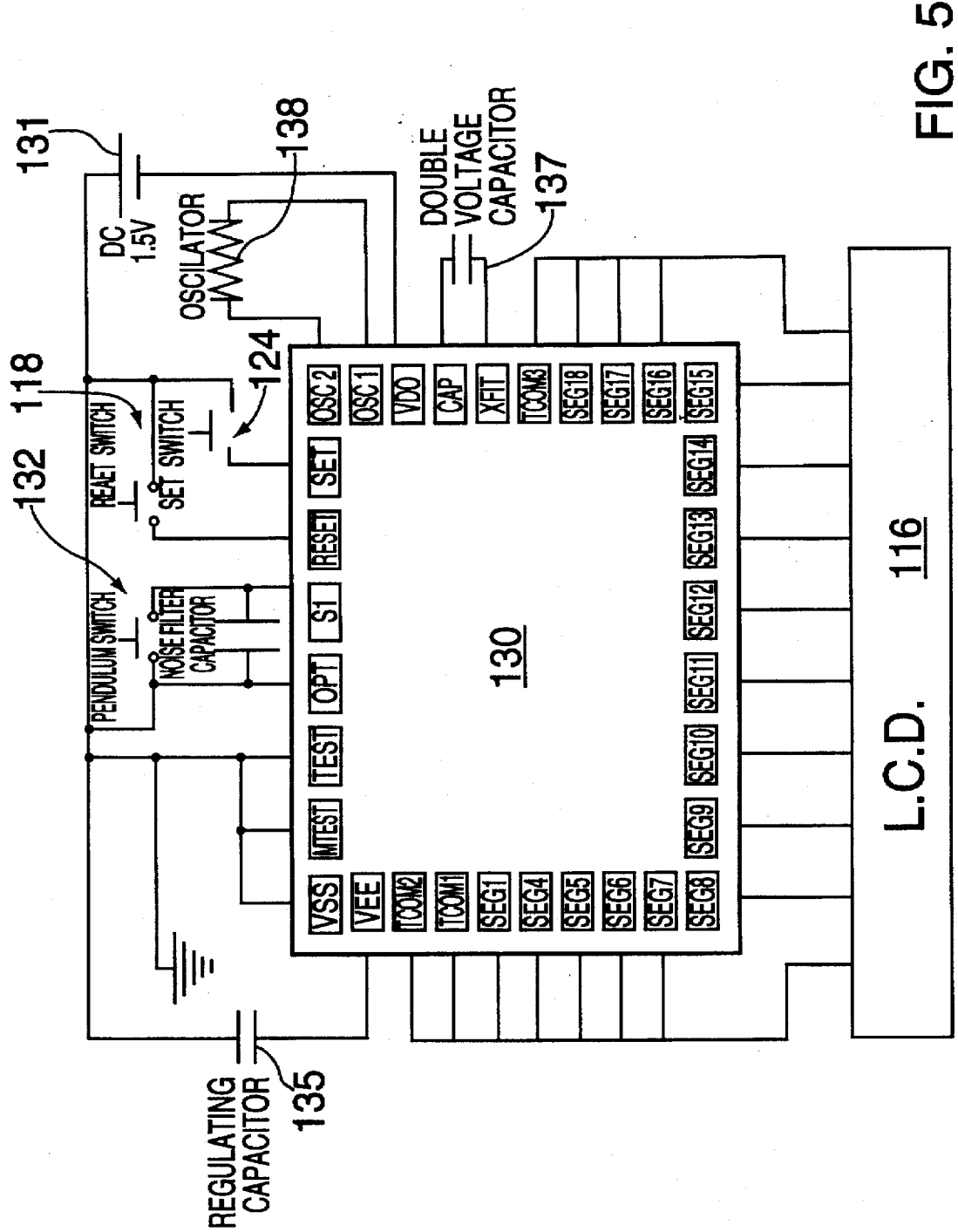
FIG. 5 is a schematic diagram of a presently preferred embodiment of the invention utilizing an integrated circuit chip.

Turning now to FIG. 5, a presently preferred embodiment of the invention is implemented on an integrated circuit chip 130 which is powered by a 1.5 V battery 131 and which supplies power to the oscillator 138 and the LCD Display 116. Those skilled in the art will appreciate that the "exercise detector transducer" mentioned above may be embodied as a "pendulum switch" 132, and the noise filter described above may, in part, be embodied by a filtering capacitor 134. The IC chip 130 is provided with a number of pins which allow the connection of external elements to the internal circuit of the chip. For example, pins labelled SEG1–SEG18 couple the circuit to display segments of the LCD display 116. It will be appreciated that the number of SEG pins will depend on the type of display and the number of maximum number of digits displayed. Certain portions of the display, such as the decimal point and the YDS and FT indicators mentioned above may be coupled to the pins labelled TCOM1–TCOM3. The negative pole of the battery 131 is coupled to the pin labelled VSS and the positive pole of the battery is coupled to the pin labelled VDD. A regulated supply is provided to the pin VEE by capacitor 135 which is coupled in series between the pin VEE and the negative pole of the battery 131. A double voltage supply is provided via a capacitor 137 which is coupled to the pins CAP and XFIT. The oscillator 138 is coupled to pins OSC1 and OSC2. The set switch 124 couples the pin SET to ground when pressed and the reset switch 118 couples the pin RESET to ground when pressed. The pendulum switch 132 couples the pin S1 to ground when activated by the user's stride and the pin S1 is otherwise coupled to ground by the capacitor 134. As shown in FIG. 5, the pin OPT is not used inside the chip. The pins TEST and MTEST are used for internal testing of the chip and are shorted to ground when the circuit is assembled.

There have been described and illustrated an apparatus for measuring distances in the game of golf. While a preferred embodiment of the invention has been described, it is not intended that the invention be limited thereto, as it is intended that the invention be as broad in scope as the art will allow and that the specification be read likewise. Thus, while particular components have been disclosed in reference to the operational circuit of the invention, it will be appreciated that other components could be utilized to achieve substantially the same results. Also, while an LCD display has been shown, it will be recognized that an LED display could be used with similar results obtained. Moreover, while particular configurations have been disclosed in reference to a pendulum switch and various capacitors, it will be appreciated that other configurations could be used as well. Furthermore, while the preferred circuit of the invention has been disclosed as embodied on a single IC chip, it will be understood that the circuit could be embodied on several chips or from several discreet components wired on a circuit board.

It will therefore be appreciated by those skilled in the art that yet other modifications could be made to the provided invention without deviating from its spirit and scope as so claimed.

We claim:

1. An apparatus for measuring distance in yards during a game of golf, said apparatus comprising:
    a) a case having means for attaching said case to a golfer's article of clothing;
    b) an electromechanical transducer housed in said case and being responsive to paces walked by the golfer when said case is attached to the golfer's article of clothing;
    c) a stride register for storing a value indicative of the golfer's stride;
    d) a counter accumulator coupled to said electromechanical transducer and to said stride register, said counter accumulator accumulating said value and storing an accumulated value in response to said electromechanical transducer and converting said accumulated value to a distance in yards;
    e) a display means coupled to said counter accumulator for displaying said distance in yards;
    f) setting means for setting said stride register to store said value for a golfer; and
    g) an electronic noise filter circuit electronically coupled between said electromechanical transducer and said counter accumulator for preventing extraneous mechanical vibration of the case from registering as a pace.

2. An apparatus according to claim 1, wherein:
said display means displays yards and tenths of yards.

3. An apparatus according to claim 1, wherein:
said setting means includes means for setting said value in feet.

4. An apparatus according to claim 1, wherein:
said value in feet includes tenths of feet.

5. An apparatus for measuring distance walked by a user, said apparatus comprising:
    a) a case having means for attaching said case to an article of clothing of the user;
    b) an electromechanical transducer housed in said case and being responsive to paces walked by the user when said case is attached to the user's article of clothing;
    c) a stride register for storing a value indicative of the user's stride;
    d) a counter accumulator coupled to said electromechanical transducer and to said stride register, said counter accumulator accumulating said value and storing an accumulated value in response to said electromechanical transducer;
    e) a display means coupled to said counter accumulator for displaying said distance;
    f) setting means for setting said stride register to store said value for a user; and
    g) an electronic noise filter circuit electronically coupled between said electromechanical transducer and said counter accumulator for preventing extraneous mechanical vibration of the case from registering as a pace.

6. An apparatus according to claim 5, wherein:
said display means displays yards.

7. An apparatus according to claim 5, wherein:
said display means displays yards and tenths of yards.

8. An apparatus according to claim 5, wherein:
said setting means includes means for setting said value in feet.

9. An apparatus according to claim 5, wherein:

said value in feet includes tenths of feet.

10. An apparatus for measuring distance walked by a user, said apparatus comprising:

a) a case which is dimensioned to be carried by the user;

b) an electromechanical transducer housed in said case and being responsive to paces walked by the user when said case is carried by the user;

c) a stride register for storing a value indicative of the user's stride;

d) a counter accumulator coupled to said electromechanical transducer and to said stride register, said counter accumulator accumulating said value and storing an accumulated value in response to said electromechanical transducer;

e) a display means coupled to said counter accumulator for displaying said distance;

f) setting means for setting said stride register to store said value for a user; and g) an electronic noise filter circuit electronically coupled between said electromechanical transducer and said counter accumulator for preventing extraneous mechanical vibration of the case from registering as a pace.

11. An apparatus according to claim 10, wherein:

said display means displays yards.

12. An apparatus according to claim 10, wherein:

said display means displays yards and tenths of yards.

13. An apparatus according to claim 10, wherein:

said setting means includes means for setting said value in feet.

14. An apparatus according to claim 10, wherein:

said value in feet includes tenths of feet.

* * * * *